US008488539B2

(12) United States Patent
Liao et al.

(10) Patent No.: US 8,488,539 B2
(45) Date of Patent: Jul. 16, 2013

(54) METHOD OF GENERATING PREAMBLE SEQUENCE

(75) Inventors: Yen-Chin Liao, Taipei (TW); Cheng-Hsuan Wu, Taipei (TW); Yung-Szu Tu, Taipei County (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 261 days.

(21) Appl. No.: 12/835,731

(22) Filed: Jul. 13, 2010

(65) Prior Publication Data
US 2011/0013721 A1    Jan. 20, 2011

Related U.S. Application Data

(60) Provisional application No. 61/225,931, filed on Jul. 16, 2009.

(30) Foreign Application Priority Data

Dec. 1, 2009 (TW) ................................ 98141062 A

(51) Int. Cl.
  *H04W 4/00* (2009.01)
(52) U.S. Cl.
  USPC ........... 370/329; 370/319; 370/328; 370/330; 370/350; 375/145; 375/149; 375/223; 375/271; 375/302; 375/365; 375/366; 455/102
(58) Field of Classification Search
  USPC .............. 370/310.2, 319–321, 203–208, 328, 370/329, 330, 350; 375/135–137, 145, 149, 375/223, 259–285, 295–315, 365–366; 455/446–453, 39–72, 102–129
See application file for complete search history.

(56) References Cited

U.S. PATENT DOCUMENTS

| 2004/0114691 A1 | 6/2004 | Kim |
| 2005/0276347 A1 | 12/2005 | Mujtaba |
| 2006/0007898 A1* | 1/2006 | Maltsev et al. ............... 370/338 |
| 2006/0140303 A1 | 6/2006 | Egashira |
| 2006/0182017 A1 | 8/2006 | Hansen |

(Continued)

FOREIGN PATENT DOCUMENTS

TW    I300657    9/2008

OTHER PUBLICATIONS

Seongkwan Kim et al., "A High-Throughput MAC Strategy for Next-Generation WLANs", Proceedings of the Sixth IEEE Internationl Symposium on a World of Wireless Mobile and Multimedia Networks (WoWMoM'05), 2005 IEEE, p. 278-285, Jun. 13, 2005.

(Continued)

*Primary Examiner* — Michael Thier
*Assistant Examiner* — Benjamin H Elliott, IV
(74) *Attorney, Agent, or Firm* — Winston Hsu; Scott Margo

(57) ABSTRACT

A method of generating preamble sequence is disclosed. A channel used by a wireless device may be divided into four sub-channels, and the method includes forming a preamble sequence of a first sub-channel, making three replicas of the preamble sequence of the first sub-channel, each replica with a phase rotation of a first angle, a second angle, and a third angle respectively, for forming each preamble sequence of a second sub-channel, a third sub-channel, and a fourth sub-channel, and arranging the preamble sequences of the first, the second, the third, and the fourth sub-channels to form a preamble sequence of the channel.

12 Claims, 8 Drawing Sheets

U.S. PATENT DOCUMENTS

| | | |
|---|---|---|
| 2006/0245472 A1 | 11/2006 | Pan |
| 2006/0251183 A1 | 11/2006 | Soffer |
| 2007/0047666 A1 | 3/2007 | Trachewsky |
| 2007/0133728 A1 | 6/2007 | Bahng |
| 2007/0147414 A1 | 6/2007 | Niu |
| 2007/0230373 A1 | 10/2007 | Li |
| 2007/0230600 A1 | 10/2007 | Bertrand |
| 2008/0075158 A1 | 3/2008 | Li |
| 2008/0101306 A1 | 5/2008 | Bertrand |
| 2008/0108456 A1 | 5/2008 | Bonito |
| 2008/0303701 A1 | 12/2008 | Zhang |
| 2009/0225727 A1* | 9/2009 | Chen ............................ 370/337 |
| 2009/0304104 A1* | 12/2009 | Le Saux et al. ............... 375/267 |
| 2010/0046656 A1 | 2/2010 | van Nee |
| 2010/0111065 A1 | 5/2010 | Noh |
| 2010/0239038 A1* | 9/2010 | Seyedi-Esfahani ........... 375/261 |
| 2010/0260159 A1* | 10/2010 | Zhang et al. ................ 370/338 |
| 2010/0290449 A1 | 11/2010 | van Nee |
| 2010/0309834 A1* | 12/2010 | Fischer et al. ................ 370/312 |
| 2011/0013583 A1* | 1/2011 | Yang et al. .................... 370/330 |
| 2011/0013721 A1* | 1/2011 | Liao et al. ..................... 375/295 |

OTHER PUBLICATIONS

W. A. Syafei et al., "Design of 600 Mbps MIMO Wireless LAN System using Glst Coding and Its FPGA Implementation", Radio and Wireless Symposium, Jan. 18-22, 2009, 2009 IEEE, pp. 296-299.

* cited by examiner

| ($\theta_1, \theta_2, \theta_3$) | (The first angle, the second angle, the third angle) |
|---|---|
| 0, 0, 0.5 | 0°, 0°, 180° |
| 0, 0.5, 0 | 0°, 180°, 0° |
| 0.25, 0, 0.75 | 90°, 0°, 270° |
| 0.25, 0.5, 0.25 | 90°, 180°, 90° |
| 0.5, 0, 0 | 180°, 0°, 0° |
| 0.5, 0.5, 0.5 | 180°, 180°, 180° |
| 0.75, 0, 0.25 | 270°, 0°, 90° |
| 0.75, 0.5, 0.75 | 270°, 180°, 270° |

FIG. 4

| (Sub-channel) | (Transmit Chain No.) | Packet detection probability (SNR=0dB) | Packet detection probability (SNR=20dB) |
|---|---|---|---|
| {A, B} | 1 | 0.967 | 0.985 |
| {A, B} | 2 | 0.969 | 0.989 |
| {A, B} | 3 | 0.973 | 0.989 |
| {A, B} | 4 | 0.976 | 0.990 |
| {B, C} | 1 | 0.958 | 0.989 |
| {B, C} | 2 | 0.962 | 0.990 |
| {B, C} | 3 | 0.975 | 0.988 |
| {B, C} | 4 | 0.974 | 0.99 |
| {C, D} | 1 | 0.956 | 0.991 |
| {C, D} | 2 | 0.971 | 0.989 |
| {C, D} | 3 | 0.983 | 0.991 |
| {C, D} | 4 | 0.973 | 0.991 |

FIG. 5

| (Sub-channel) | (Transmit Chain No.) | Packet detection probability (SNR=0dB) | Packet detection probability (SNR=20dB) |
|---|---|---|---|
| {A, B} | 1 | 1.0 | 1.0 |
| {A, B} | 2 | 0.89 | 0.9 |
| {A, B} | 3 | 0.92 | 0.94 |
| {A, B} | 4 | 0.94 | 0.99 |
| {B, C} | 1 | 1.0 | 1.0 |
| {B, C} | 2 | 0.87 | 0.89 |
| {B, C} | 3 | 0.92 | 0.95 |
| {B, C} | 4 | 0.95 | 0.99 |
| {C, D} | 1 | 0.999 | 1.0 |
| {C, D} | 2 | 0.88 | 0.91 |
| {C, D} | 3 | 0.93 | 0.94 |
| {C, D} | 4 | 0.95 | 0.99 |

FIG. 6

| (Transmit Chain No.) | Packet detection probability (SNR=0dB) | Packet detection probability (SNR=20dB) |
|---|---|---|
| 1 | 1.0 | 1.0 |
| 2 | 1.0 | 1.0 |
| 3 | 1.0 | 1.0 |
| 4 | 1.0 | 1.0 |

FIG. 7

| (Transmit Chain No.) | Packet detection probability (SNR=0dB) | Packet detection probability (SNR=20dB) |
|---|---|---|
| 1 | 1.0 | 1.0 |
| 2 | 0.917 | 1.0 |
| 3 | 0.964 | 0.990 |
| 4 | 0.942 | 0.989 |

FIG. 8

METHOD OF GENERATING PREAMBLE SEQUENCE

CROSS REFERENCE TO RELATED APPLICATIONS

This application claims the benefit of U.S. Provisional Application No. 61/225,931, filed on Jul. 16, 2009 and entitled "WIRELESS TRANSMISSION METHOD AND DEVICE USING THE SAME", the contents of which are incorporated herein.

BACKGROUND OF THE INVENTION

1. Field of the Invention

The present invention relates to a method of generating preamble sequence for a wireless local area network device, and more particularly, to a method of generating preamble sequence for a wireless local area network device complying with IEEE 802.11ac standard.

2. Description of the Prior Art

Wireless local area network (WLAN) technology is one of popular wireless communication technologies, which is developed for military use in the beginning and in recent years, is widely implemented in consumer electronics, e.g. desktop computers, laptop computers, personal digital assistants, etc., to provide the masses with a convenient and high-speed internet communication. IEEE 802.11 is a set of WLAN protocols created by the Institute of Electrical and Electronics Engineers, evolved from the former IEEE 802.11a/b/g standard to the current mainstream IEEE 802.11n standard.

IEEE 802.11a/g/n standard adopt orthogonal frequency division multiplexing (OFDM) method, which has advantages of high spectrum utility efficiency and capability of resisting signal attenuation caused by a multipath propagation; whereas, as to transmitters in WLAN systems, the peak-to-average power ratio (PAPR) of modulated signals may easily be excessively high, and a distortion may occur when the modulated signals are processed in radio frequency (RF) circuits of the transmitters, resulting in a decrease of packet detection probability in a receiver. IEEE 802.11n standard is different from IEEE 802.11a/g standard in adding a multiple-input multiple-output (MIMO) technique and other features that greatly enhance data rate and throughput. In addition, in IEEE 802.11n standard the channel bandwidth is doubled to 40 MHz from 20 MHz.

Please refer to FIG. 1, which is a diagram of an IEEE 802.11n packet structure according to the prior art. An IEEE 802.11n packet consists of a preamble portion in the front of a packet and a payload portion after the preamble portion, carrying data to be transmitted. An IEEE 802.11n preamble is a mixed format preamble and is backward compatible with IEEE 802.11a/g standard devices, and includes legacy Short Training field (L-STF), legacy Long Training field (L-LTF), legacy Signal field (L-SIG), high-throughput Signal field (HT-SIG), high-throughput Short Training field (HT-STF), and high-throughput Long Training fields (HT-LTF). L-STF is used for start-of-packet detection, automatic gain control (AGC), initial frequency offset estimation, and initial time synchronization. L-LTF is used for further fine frequency offset estimation and time synchronization. L-SIG carries the data rate (which modulation and coding scheme is used) and length (amount of data) information. HT-SIG also carries data rate and length information, and is used for packet detection so that the mixed format or the legacy format the transmitted packet uses can be detected. HT-STF is used for automatic gain control. HT-LTF is used for MIMO channel detection.

According to the present IEEE 802.11n standard, the lower 20 MHz portion of the 40 MHz preamble is equal to the legacy, IEEE 802.11a/g 20 MHz preamble, and the upper 20 MHz portion of the 40 MHz preamble is a replica of the lower 20 MHz portion with a phase rotation of 90 degrees. The 90-degree rotation on the upper 20 MHz portion is added in order to reduce PAPR when transmitting packets, and therefore the packet detection probability in a receiver is improved.

For the achievement of a higher quality wireless LAN transmission, the IEEE committee creates a new generation IEEE 802.11ac standard, which is IEEE 802.11 VHT (Very High Throughput) standard. Compared to the channel bandwidth of 40 MHz in IEEE 802.11n standard, the channel bandwidth in IEEE 802.11ac standard is increased to 80 MHz. For backward compatibility to wireless devices applying IEEE 802.11a/g/n standard, IEEE 802.ac standard must be designed to be capable of using the 20 MHz channel and the 40 MHz channel selectively. Therefore, besides the backward compatibility of the channel bandwidth, the possibility of excessively high PAPR is also a remarkable issue in designing the preamble.

SUMMARY OF THE INVENTION

It is therefore a primary objective of the claimed invention to provide a method of generating preamble sequence for a wireless local area network device.

The present invention discloses a method of generating preamble sequence, wherein a channel used by the wireless device are divided into four sub-channels including a first sub-channel, a second sub-channel, a third sub-channel and a fourth sub-channel, the method including forming a preamble sequence of a first sub-channel, making a replica of the preamble sequence of the first sub-channel with a phase rotation of a first angle obtained from a memory installed in the wireless device, for forming a preamble sequence of a second sub-channel, making a second replica of the preamble sequence of the first sub-channel with a phase rotation of a second angle obtained from the memory, for forming a preamble sequence of a third sub-channel, making a third replica of the preamble sequence of the first sub-channel with a phase rotation of a third angle obtained from the memory, for forming a preamble sequence of a fourth sub-channel, and arranging the preamble sequences of the first, the second, the third, and the fourth sub-channels to form a preamble sequence of the channel.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a list of the best rotation angles according to the format of the 80 MHz preamble sequence in FIG. 2.

FIG. 5 is a list of the minimum values of the packet detection probability under different SNR by each 40 MHz sub-channel and each transmit chain, measured by an auto-correlation detector of a 40 MHz receiver.

FIG. 6 is a list of the minimum values of the packet detection probability under different SNR by each 40 MHz sub-channel and each transmit chain, measured by a cross-correlation detector of a 40 MHz receiver.

FIG. 7 is a list of the minimum values of the packet detection probability under different SNR by each transmit chain, measured by an auto-correlation detector of an 80 MHz receiver.

FIG. 8 is a list of the minimum values of the packet detection probability under different SNR by each transmit chain, measured by a cross-correlation detector of an 80 MHz receiver.

DETAILED DESCRIPTION

Figure 1:
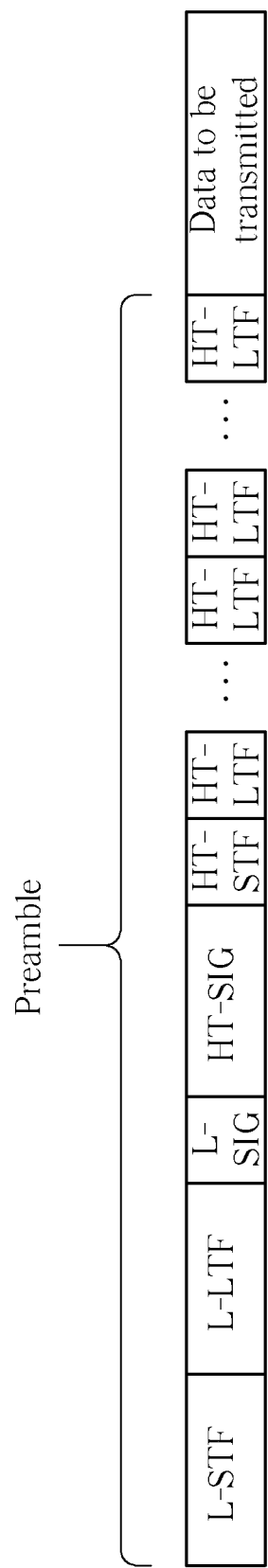
FIG. 1 is a diagram of a conventional IEEE 802.11n packet structure.
Figure 2:
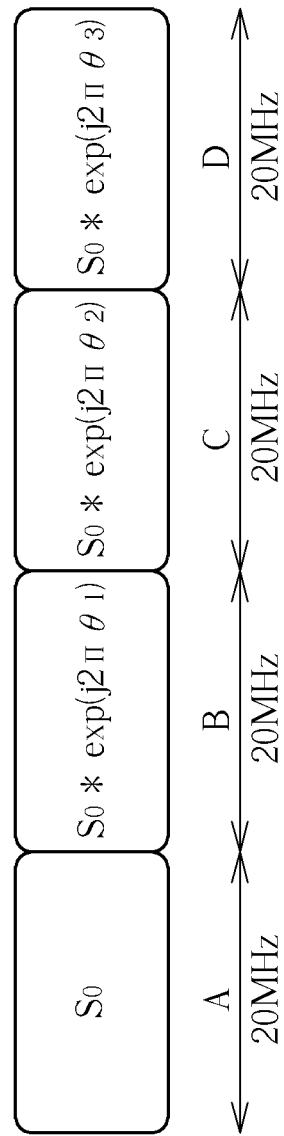
FIG. 2 is a schematic diagram of an 80 MHZ channel preamble sequence of a packet in frequency domain according to an embodiment of the present invention.

Please refer to FIG. 2. FIG. 2 is a schematic diagram of an 80 MHZ channel preamble sequence of a packet complying IEEE 802.11ac standard in frequency domain according to an embodiment of the present invention, and the 80 MHz channel can be divided into four 20 MHz sub-channels, labeled A, B, C, and D respectively from low frequency to high frequency. A preamble sequence $S_0$ of the sub-channel A is identical to the 20 MHz preamble sequence of the prior art IEEE 802.11a standard; each preamble sequence of sub-channel B, C, and D is obtained by rotating the replica of the preamble sequence $S_0$ of the sub-channel A by different angles respectively. The preamble sequence of sub-channel B is $S_0 \times \exp(j2\pi\theta_1)$, the preamble sequence of sub-channel C is $S_0 \times \exp(j2\pi\theta_2)$, and preamble sequence of sub-channel D is $S_0 \times \exp(j2\pi\theta_3)$.

Figure 3:
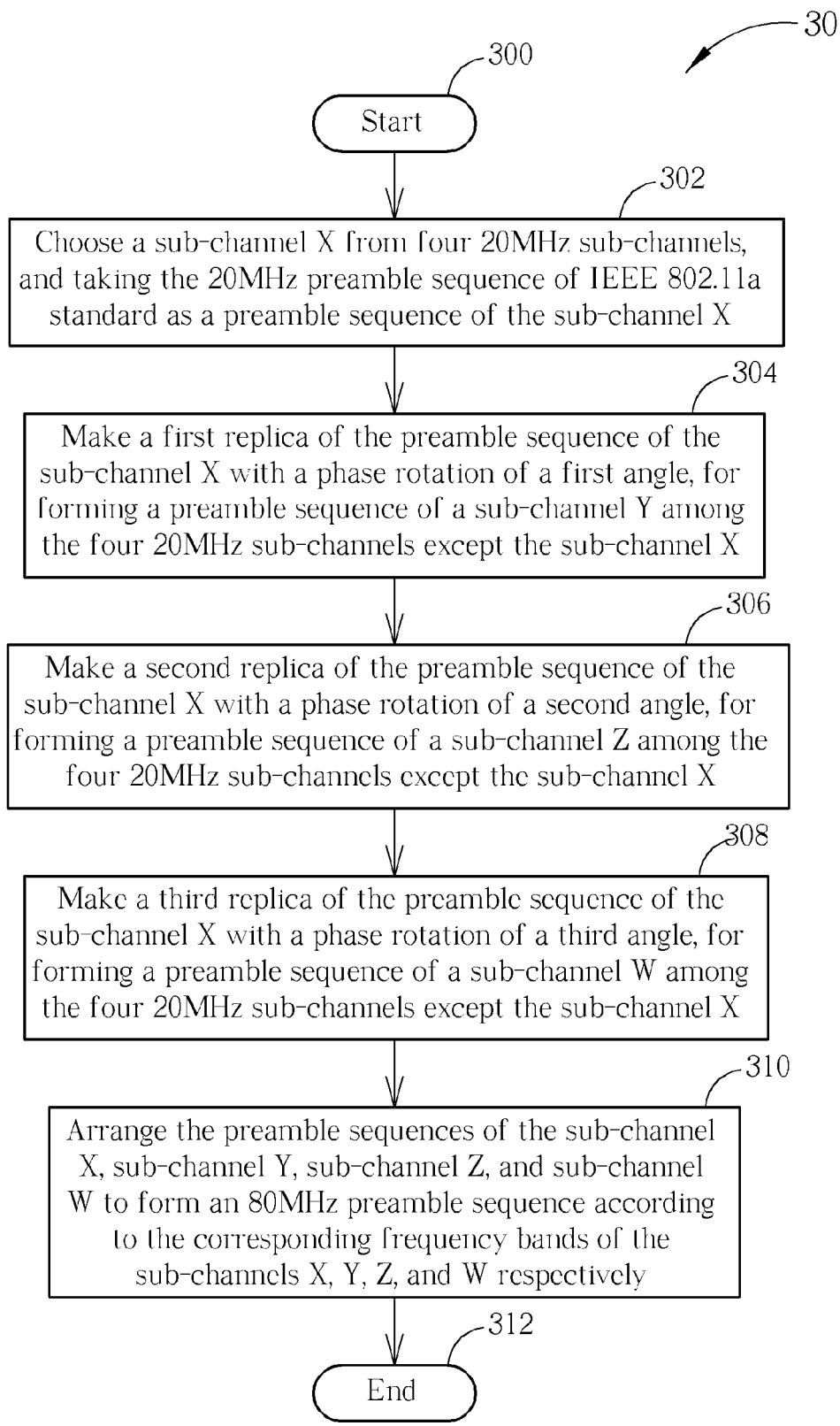
FIG. 3 is a flowchart of a process according to an embodiment of the present invention.

Please refer to FIG. 3. FIG. 3 is a flowchart of a process 30 according to the present invention. The process 30 can be used in a wireless device complying IEEE 802.11ac standard, for generating 80 MHz preamble sequence, such as the preamble sequence in FIG. 2. The wireless device can be a WLAN card, a WLAN access point, a computer, and a mobile communication device such as a mobile phone or a PDA. The process 30 comprises the following steps:

Step 300: Start.

Step 302: Choose a sub-channel X from four 20 MHz sub-channels, and taking the 20 MHz preamble sequence of IEEE 802.11a standard as a preamble sequence of the sub-channel X.

Step 304: Make a first replica of the preamble sequence of the sub-channel X with a phase rotation of a first angle, for forming a preamble sequence of a sub-channel Y among the four 20 MHz sub-channels except the sub-channel X.

Step 306: Make a second replica of the preamble sequence of the sub-channel X with a phase rotation of a second angle, for forming a preamble sequence of a sub-channel Z among the four 20 MHz sub-channels except the sub-channel X.

Step 308: Make a third replica of the preamble sequence of the sub-channel X with a phase rotation of a third angle, for forming a preamble sequence of a sub-channel W among the four 20 MHz sub-channels except the sub-channel X.

Step 310: Arrange the preamble sequences of the sub-channel X, sub-channel Y, sub-channel Z, and sub-channel W to form an 80 MHz preamble sequence according to the corresponding frequency bands of the sub-channels X, Y, Z, and W respectively.

Step 312: End.

According to the step 302, first, choosing a sub-channel X from the four 20 MHz sub-channels divided from an 80 MHz channel, and taking the 20 MHz preamble sequence of IEEE 802.11a standard as a preamble sequence $S_0$ of the sub-channel X. The 20 MHz preamble sequence of IEEE 802.11a standard is stored in advance in a memory installed in a wireless device. Please note that the process 30 places no restriction on the corresponding frequency band of the sub-channel X, which can be designed freely in practice. After the preamble sequence $S_0$ of the sub-channel X is formed according to the step 302, the steps 304, 306, and 308 are performed at the same time in no particular order; the sub-channels Y, Z, and W are three sub-channels among the four 20 MHz sub-channels except the sub-channel X, and the frequency bands of the sub-channels Y, Z, and W are also without any restriction.

The steps 304 to 308 are used for generating three replicas of preamble sequence $S_0$, and performing the phase rotation to the three replicas respectively to form the preamble sequences of the other three sub-channels except the sub-channel X. In details, the step 304 makes the replica of preamble sequence $S_0$ with the phase rotation of the first angle, $2\pi\theta_1$ in radians, for forming the preamble sequence $S_1$ of the sub-channel Y, $S_1 = S_0 \times \exp(j2\pi\theta_1)$. The step 306 also makes the replica of preamble sequence $S_0$ with the phase rotation of the second angle, $2\pi\theta_2$ in radians, for forming the preamble sequence $S_2$ of the sub-channel Z, $S_2 = S_0 \times \exp(j2\pi\theta_2)$. The step 308 also makes the replica of preamble sequence $S_0$ with the phase rotation of the third angle, $2\pi\theta_3$ in radians, for forming a preamble sequence $S_3$ of the sub-channel W, $S_3 = S_0 \times \exp(j2\pi\theta_3)$. The values of the above-mentioned first angle, second angle, and third angle are stored in advance in the memory installed in the wireless device. Last, according to the step 310, the above-mentioned preamble sequences $S_0$, $S_1$, $S_2$, and $S_3$ are arranged based on the order of the corresponding frequency bands of the sub-channels, forming a preamble sequence S of 80 MHz channel that is the 80 MHz preamble sequence of IEEE 802.11ac standard.

It can be seen from the above that the process 30 is to choose one sub-channel from the four 20 MHz sub-channels, design the preamble sequence of the sub-channel to be conformed with the 20 MHz preamble sequence of IEEE 802.11a standard, fix the phase of the preamble sequence (which can be regarded as rotating by 0°) and rotate the phase of the preamble sequences of the other three sub-channels relative to the preamble sequence with phase rotation of 0°. Take the 80 MHz preamble sequence in FIG. 2 as an example, the preamble sequence of the sub-channel A of the lowest frequency is formed by the step 302 of the process 30, and the other sub-channels B, C, and D are formed according to the step 304 to the step 308. Please note that the process 30 is able to form multiple different 80 MHz preamble sequences, and what illustrated in FIG. 2 is merely an embodiment. The step 302 of the process 30 can also be utilized to form the preamble sequences of the sub-channel B of the second lowest frequency band, that of the sub-channel C of the second highest frequency band, or that of the sub-channel D of the highest frequency band.

For degrading complexity of practices, an embodiment of the present invention defines $\theta_1$, $\theta_2$ or $\theta_3$ to be a multiple of 0.25, i.e. 0, 0.25, 0.5, or 0.75, making the first angle, the second angle, or the third angel to be a multiple of 90°, i.e. 0°, 90°, 180°, or 270°. Therefore, in performing the step 304 to step 308, the preamble sequence $S_0$ only needs to be multiplied by +1, −1, +j, or −j, so as to promote the system operation speed effectively. The preamble sequences of the sub-channel Y, Z, and W in the process 30 can be represented as follows:

$$S_i = S_0 \times \exp(j2\pi\theta_i), \theta_i \in \{0, 0.25, 0.5, 0.75\}, i=1,2,3.$$

Based on the premise that merely the preamble sequences of three sub-channels are rotated in the process 30, and the definition that $\theta_1$, $\theta_2$ and $\theta_3$ are multiples of 0.25, the present invention only needs to find out the combination ($\theta_1$, $\theta_2$, $\theta_3$) by which the PAPR of the 80 MHz preamble sequence has the minimum value among $4^3=64$ sets of permutations and combinations of ($\theta_1$, $\theta_2$, $\theta_3$), i.e. to find out the best combination of the first angle, the second angle, and the third angle without searching among $4^4=256$ sets of angles, so as to degrade system operation loads substantially.

Furthermore, 8 sets of ($\theta_1$, $\theta_2$, $\theta_3$) bringing about the minimum PAPR of the 80 MHz preamble sequence are searched out according to the format of the 80 MHz preamble sequence in FIG. 2, as listed in FIG. 4. FIG. 4 is the list of the above-mentioned 8 sets of ($\theta_1$, $\theta_2$, $\theta_3$) and the corresponding rotation angles, and the 8 sets of ($\theta_1$, $\theta_2$, $\theta_3$) are (0, 0, 0.5), (0, 0.5, 0), (0.25, 0, 0.75), (0.25, 0.5, 0.25), (0.5, 0, 0), (0.5, 0.5, 0.5), (0.75, 0, 0.25), and (0.75, 0.5, 0.75) respectively, and the combinations of the corresponding first angle, second angle, and third angle are (0°, 0°, 180°), (0°, 180°, 0°), (90°, 0°, 270°), (90°, 180°, 90°), (180°, 0°, 0°), (180°, 180°, 180°), (270°, 0°, 90°), and (270°, 180°, 270°) in order. The values of the above 8 sets of ($\theta_1$, $\theta_2$, $\theta_3$) are stored in the memory installed in the wireless device.

In order to verify whether the receivers in the wireless system are capable of detecting the preamble using the 8 sets of the rotation angles correctly, a simulation is performed based on a channel model B of IEEE 802.11n standard. The transmitter transmits 1000 packets that merely comprise the 80 MHz preamble sequence of FIG. 2 with phase rotation of angles in FIG. 4; a 40 MHz receiver and an 80 MHz receiver receive the 1000 packets and calculate packet detection probability respectively. Note that the 80 MHz channel can be divided into four non-overlapping 20 MHz sub-channels A, B, C, and D, as in FIG. 2, and the 80 MHz channel can also be divided into three partially overlapping 40 MHz sub-channels {A, B}, {B, C}, and {C, D}.

Please refer to FIG. 5. In FIG. 5, the minimum values of the packet detection probability under different signal-to-noise ratio (SNR) by 40 MHz sub-channels {A, B}, {B, C}, {C, D}, and each transmit chain, measured by an auto-correlation detector of a 40 MHz receiver, are listed. Please refer to FIG. 6. In FIG. 6, the minimum values of the packet detection probability under different SNR by 40 MHz sub-channels {A, B}, {B, C}, {C, D} and each transmit chain, measured by a cross-correlation detector of a 40 MHz receiver, are listed. It can be seen from FIG. 5 and FIG. 6 that the minimum values of the packet detection probability detected by the 40 MHz receiver lie in the acceptable range, which indicates that even the 40 MHz receiver does not support IEEE 802.11ac standard, the 40 MHz receiver can still detect the 80 MHz preamble sequence generated by the process 30 successfully.

Please refer to FIG. 7. In FIG. 7, the minimum values of the packet detection probability under different SNR by each transmit chain, measured by an auto-correlation detector of an 80 MHz receiver, are listed. Please refer to FIG. 8. In FIG. 8, the minimum values of the packet detection probability under different SNR by each transmit chain, measured by a cross-correlation detector of an 80 MHz receiver, are listed. It can be seen from FIG. 7 and FIG. 8 that most of the minimum values of the packet detection probability measure by the 80 MHz receiver reach up to 100%, which indicates that the 80 MHz preamble sequence generated by the process 30 can be detected by the 80 MHz receiver successfully.

To sum up, the method of generating preamble sequence provided by the present invention is capable of forming the preamble sequence conforming IEEE 802.11ac standard, and the preamble sequence formed is backward compatible to IEEE 802.11a/g/n standard wireless devices. Preferably, the present invention further finds out the best phase rotation angles of preamble sequence of each sub-channel, optimizing the PAPR of preamble sequences.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating a preamble sequence for a wireless device, wherein a channel used by a wireless device is divided into four sub-channels including a first sub-channel, a second sub-channel, a third sub-channel and a fourth sub-channel, the method comprising:
   forming a preamble sequence of a first sub-channel;
   making a replica of the preamble sequence of the first sub-channel with a phase rotation of a first angle obtained from a memory installed in the wireless device, for forming a preamble sequence of a second sub-channel;
   making a second replica of the preamble sequence of the first sub-channel with a phase rotation of a second angle obtained from the memory, for forming a preamble sequence of a third sub-channel;
   making a third replica of the preamble sequence of the first sub-channel with a phase rotation of a third angle obtained from the memory, for forming a preamble sequence of a fourth sub-channel; and
   arranging the preamble sequences of the first, the second, the third, and the fourth sub-channels to form a preamble sequence of the channel;
   wherein at least two of the first angle, the second angle, the third angle and an angle of the preamble sequence of the first sub-channel are the same.

2. The method of generating a preamble sequence of claim 1, wherein the frequency band of the first sub-channel is of the lowest frequency among the frequency bands of the four sub-channels.

3. The method of generating a preamble sequence of claim 1, wherein the first angle, the second angle, and the third angle are 0°, 0°, and 180° respectively.

4. The method of generating a preamble sequence of claim 1, wherein the first angle, the second angle, and the third angle are 0°, 180°, and 0° respectively.

5. The method of generating a preamble sequence of claim 1, wherein the first angle, the second angle, and the third angle are 90°, 0°, and 270° respectively.

6. The method of generating a preamble sequence of claim 1, wherein the first angle, the second angle, and the third angle are 90°, 180°, and 90° respectively.

7. The method of generating a preamble sequence of claim 1, wherein the first angle, the second angle, and the third angle are 180°, 0°, and 0° respectively.

8. The method of generating a preamble sequence of claim 1, wherein the first angle, the second angle, and the third angle are 180°, 180°, and 180° respectively.

9. The method of generating a preamble sequence of claim 1, wherein the first angle, the second angle, and the third angle are 270°, 0°, and 90° respectively.

10. The method of generating a preamble sequence of claim 1, wherein the first angle, the second angle, and the third angle are 270°, 180°, and 270° respectively.

11. The method of generating a preamble sequence of claim 1, wherein the bandwidth of the channel used by the wireless device is 80 MHz, and the bandwidth of each sub-channel among the first sub-channel to the fourth sub-channel is 20 MHz.

12. The method of generating a preamble sequence of claim 1, wherein the wireless device conforms to the IEEE 802.11ac standard.

* * * * *